Nov. 16, 1954 H. T. HIGGINS Re. 23,896
SAFETY CONTROL AND SIGNAL SYSTEM FOR MOTOR VEHICLES
Original Filed Dec. 22, 1948
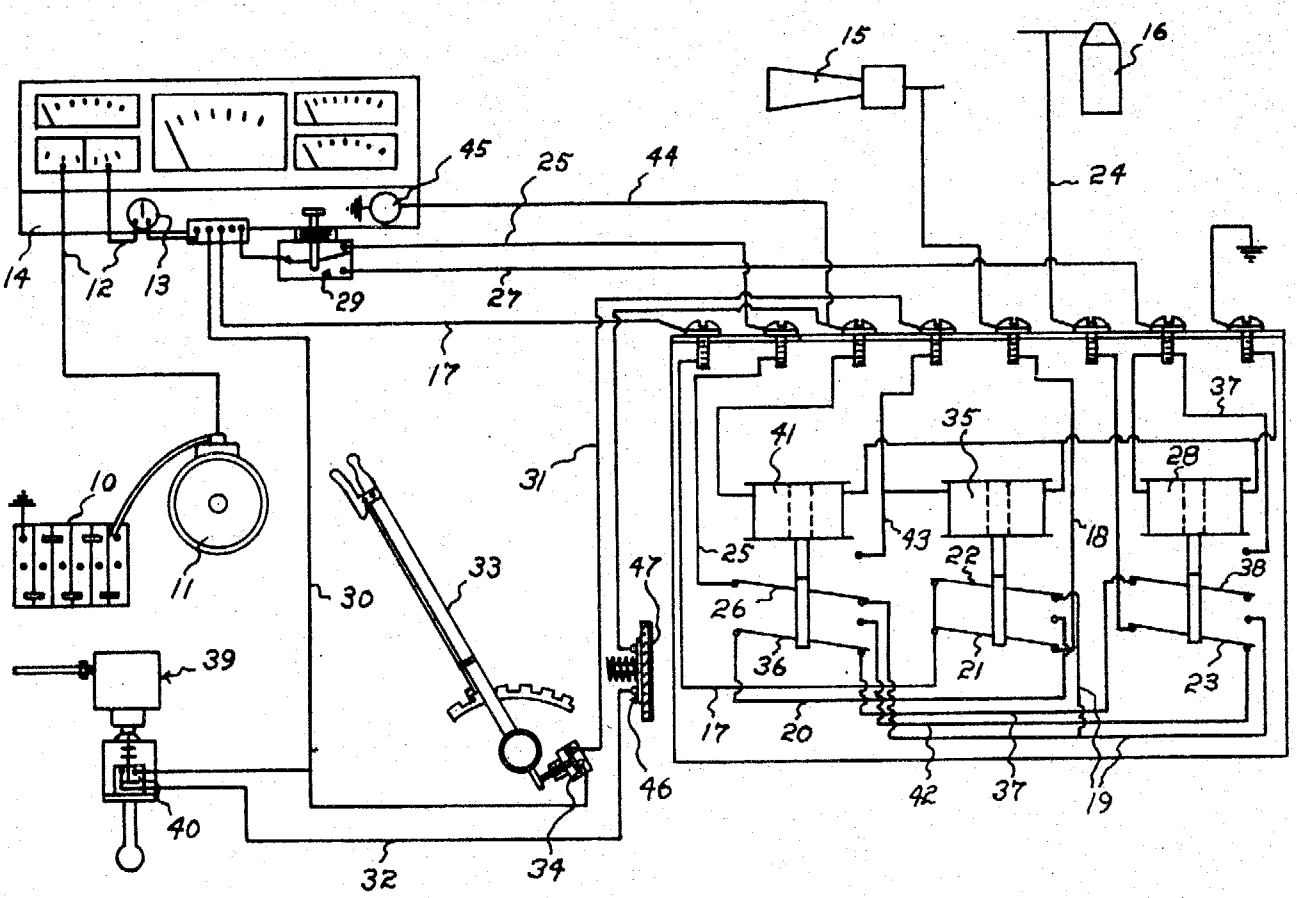
Inventor:
Harold T. Higgins,
by Abbott Gear
Attorney United States Patent Office Re. 23,896
Reissued Nov. 16, 1954

23,896

SAFETY CONTROL AND SIGNAL SYSTEM FOR MOTOR VEHICLES

Harold T. Higgins, Hyde Park, Mass.

Original No. 2,629,085, dated February 17, 1953, Serial No. 66,626, December 22, 1948. Application for reissue February 16, 1954, Serial No. 410,749

8 Claims. (Cl. 340—53)

Matter enclosed in heavy brackets [ ] appears in the original patent but forms no part of this reissue specification; matter printed in italics indicates the additions made by reissue.

My present invention relates to control means for motor vehicles to prevent their normal operation when some unsafe condition exists.

While my invention is adapted for other uses, its novel features and advantages may be most readily appreciated by considering its use in buses. Many accidents involving buses are attributable to their having been operated when some standard of safety has not been met. For example, it is obviously not safe to operate a bus when the brake operating pressure is below a predetermined minimum but, in spite of gauges which register such pressure, failure of the brake system is a common cause of accidents. While such failure is sometimes due to mechanical difficulties, it is more often due to the fact that the operator does not take the trouble to look at the pressure gauge at regular intervals or take the time to ensure that the engine develops adequate brake operating pressure before the start of a trip.

In its simplest form, my invention provides control means for a motor vehicle in which signals, either visual or audible or both, are electrically operated when one or more standards of safety are not met. In practice, the operation of such signals is attended by an interruption of the ignition circuit and means are provided to enable that circuit to be completed only under emergency conditions. In its preferred embodiment, my invention also makes it impossible to drive the motor vehicle under emergency conditions, except at a slow speed.

While such control means are well adapted to meet the general objective of my invention of safeguarding a motor vehicle against normal operation, either by way of the sounding of a signal, by interruption of its ignition circuit, or by limiting its speed, when an unsafe condition exists, my invention embodies further safeguards as in its preferred embodiment, my control means meets the general objective of safeguards against its own failure. These are effected by providing that any failure in my control results in its being operative only on the safe side and contributing to that is the fact that the control relays are the last element in their circuits ensuring against improper operation in the event of "shorts" therein.

In the drawing, I have indicated schematically a wiring diagram of preferred control means in accordance with my invention by which a motor vehicle cannot be operated, except under emergency conditions, unless certain standards of safety exist.

At 10 and 11, I have indicated a battery and generator, respectively, as the conventional source of electrical energy of a motor vehicle. A lead 12 from that source includes the ignition switch 13 adjacent the instrument panel 14. At 15, I have indicated a horn as illustrative of conventional warning signals and at 16 I have suggested the ignition coil as representative of engine circuits.

At 17, I have indicated a primary circuit having a first parallel lead 18 which includes the horn 15, a second parallel lead 19, and a third parallel lead 20. First and second switches 21 and 22, respectively, have first and second positions. Their first positions are normal and, as shown, in the first position of the switch 21, the horn circuit 18 is connected to the primary circuit 17 and in the first position of the switch 22, the second lead 19 is connected thereto. In their second positions, the switch 21 disconnects the horn circuit 18 from the primary circuit 17 and connects the third lead 20 thereto and the switch 22 opens the second lead 19.

A switch 23 has a first or normal position and a second position in which it connects the second lead 19 to the circuit 24 which includes the ignition coil 16. An auxiliary power circuit 25 includes a switch 26 having a normal or first position and a second position, in the first of which it connects the auxiliary power circuit 25 to the second lead 19 of the primary circuit 17.

In order to enable the ignition circuit 24 to be closed when certain safety standards have not been satisfied, I provide a first control circuit 27 which includes a relay 28 operatively connected to the switch 23 so that whenever the relay 28 is energized the second position of the switch 23 is established. I utilize a control switch 29 having a normal position connecting the auxiliary circuit 25 to the source of electrical energy but resiliently yieldable to connect the control circuit 27 thereto. As long as it is thus held by the operator, the primary circuit 17 and the ignition circuit 24 are interconnected so that the engine can be started but with the horn circuit 18 closed to thereby provide a basis for operating the motor vehicle under emergency conditions.

In the embodiment of my invention shown in the drawing, I employ a lead 30 to the source. The lead 30 includes parallel safety circuits 31 and 32 which have switches that are closed when certain safety requirements or standards are met.

At 33, I have shown an emergency or parking brake indicated as having a switch 34 in the safety circuit 31 which includes a relay 35. The switch 34 is closed when the brake 33 is applied and the relay 35 is operatively connected to the switches 21 and 22 to move them from their first or normal positions into their second positions whenever it is energized. As stated, the switch 21 then connects the third lead 20 to the primary circuit 17 and opens the signal circuit 18 and the switch 22 opens the second lead 19. The third lead 20 includes a switch 36 having a first or normal position and a second position. In its first position, the switch 36 connects a holding circuit 37 to the third lead 20. The holding circuit 37 includes a switch 38, the lead 27, and the relay 28. The switch 38 is operatively connected to the relay 28 to be closed whenever it is energized.

From the foregoing, it will be apparent that when the first safety circuit is closed, the relay 28 is energized but the primary circuit 17 is disconnected from the ignition circuit 24 so that the auxiliary circuit 25 must be used making it necessary for the control switch 29 to be released into its normal position.

I have generally indicated a device 39 responsive to brake operating pressure and operatively connected to the normally open switch 40 to close it when a predetermined brake operating pressure exists. Until then, the vehicle may be driven only under emergency conditions to a safe place or to a place where it may be given necessary service when the emergency or parking brake 33 is released.

The device 39 may be of the type shown in my copending application, Serial No. 578,532, filed February 17, 1945, now Patent No. 2,459,938, to prevent the normal opening of the throttle value unless predetermined brake operating pressures exist so that while the engine may be run to warm it up or to build up brake operating pressures, it may be driven only at a slow speed under emergency conditions.

When sufficient brake operating pressure exists to enable the motor vehicle to be safely operated, the device 39 is operable to close the switch 40, thereby closing the safety circuit 32 to its relay 41. The parking brake 33 may then be released and the motor vehicle conventionally operated. The relay 41 is operatively connected to the switch 26 and to the switch 36 so that whenever it is energized, the switches 26 and 36 are moved into their second positions.

In the embodiment of my invention shown in the drawings, the second position of the switch 36 disconnects the holding circuit 37 from the primary circuit 17 so that the switches 38 and 23 are restored to their first positions but completes the ignition circuit 24 through the lead 42. In the second position of the switch 26, the auxiliary circuit 25 is disconnected from the second lead 19 and is connected to a holding circuit 43 for the second relay 35. As long as suitable brake operating pressures exist, the brake 33 may be released, but should it be released when insufficient brake operating pressure exists, the relay 35 is de-energized so that the switch 21 completes the signal circuit 18.

From the foregoing, it will be appreciated that the circuit 27 includes the relay 28 and that this circuit may be energized, to permit emergency operation of the vehicle, by moving the switch 29 from its normal position. When the relay 28 is energized, the switch 38 is moved from its normal position to interconnect the leads 37. The interconnected leads 37 are connected by the switch 36, in its normal position, to the lead 20 so that when the relay 35 is energized, they are connected to lead 17 by the switch 21. A holding circuit for the relay 28 is thus established when certain safety conditions have been established as represented by the application of the parking brake.

When the vehicle may be safely driven as when the switch 40 is closed, the circuit 32 is completed to the relay 41. As a consequence, the switch 26 connects the lead 27 to the lead 43 to serve as a holding circuit for the relay 35. Under these circumstances, the energized lead 20 is connected to the lead 42 by the switch 36 which is now in its second position and the holding circuit for the relay 28 is now open so that its switch 23 returns to its first or normal position to connect the lead 42 to the ignition circuit 24.

Various other safety factors may be provided in accordance with my invention. Thus, I have shown the safety circuit 32 as having a lead 44 to a pilot light 45 on the instrument panel 14 and as having a safety switch 46 held closed under glass as at 47, by emergency door latches or the like. Such safety switches may be located any place in the vehicle to provide maximum safety.

From the foregoing, it will be appreciated that under normal conditions and with no safety standard satisfied, the signal circuit is closed and the circuit to the ignition system is open. Under emergency conditions, the switch may be operated by manually holding the switch 29 to connect the first control circuit to energize the relay 28 to complete the circuit to the ignition system with the signal still in operation.

When a safety standard is satisfied, such as the application of the parking brake, the relay 35 is energized and is operative to disconnect the signal and also to connect the holding circuit to the relay 28 thereby to maintain the circuit closed to the ignition system with the switch 29 released.

While it will be apparent that my invention makes it possible to safeguard against the operation of a motor vehicle under conditions when it is unsafe to do so, attention is directed to the fact that in the preferred embodiments thereof, failure of any circuit results in my control means becoming operative to permit the motor vehicle to be operated only under emergency conditions. In this connection, it will be noted that preferably each relay is the last element in its circuits so that in the event of a short therein, normal operation of the motor vehicle when, in fact, unsafe conditions exist, is impossible.

What I therefore claim and desire to secure by Letters Patent is:

1. Control means for a motor vehicle having a switch controlled source of electrical energy, an electrically operated signal, and an ignition system, said means comprising a primary circuit including first, second, and third parallel leads, the first of which includes said signal, first and second switches having normal first positions in which said first switch connects said first lead to said primary circuit and said second switch connects said second lead thereto and second positions in which said first switch disconnects said first lead from said primary circuit and connects said third lead thereto and said second switch opens said second lead, a third switch having first and second positions in the second of which said second lead is connected to said ignition system, an auxiliary power circuit including a fourth switch having first and second positions in the first of which it is connected to said second lead, a first control circuit including a first relay operatively connected to said third switch to move it from its first to its second position, a control switch normally connecting said auxiliary power circuit to said source, but resiliently yieldable to connect said first control circuit thereto, thereby to energize said first relay to effect the second position of said third switch and a lead from said source and including first and second parallel safety circuits each of which includes a switch closed in response to the existence of a predetermined standard of safety, said first safety circuit including a second relay operatively connected to said first and second switches to move them from their first to their second positions, said third lead of said primary circuit including a fifth switch having first and second positions, a holding circuit connected to said first control circuit to said first relay connected to said third lead by said fifth switch in its first position and including a sixth switch closed when said first relay is energized, said holding circuit being operable when said first relay is energized by the actuation of said resilient switch and when the safety standard of said first safety circuit is satisfied, a lead connecting said third lead to said second ignition system when said fifth switch is in its second position and said third switch is in its first position, and said second safety circuit including a third relay operatively connected to said fourth and fifth switches to move them from said first to said second positions, and a holding circuit for said second relay connected to said auxiliary power circuit by said fourth switch in its second position.

2. The control means of claim 1 in which each relay is located at the ground end of any circuit thereto.

3. The control means of claim 1 in which each relay operated switch returns to its first position when its relay is de-energized.

4. The control means of claim 1 in which a safety circuit includes a normally open switch held closed when a safety standard is met.

5. Control means for a motor vehicle having a switch controlled source of electrical energy, an electrically operated signal, and an ignition system, said control means comprising power and control circuits, *separate* switches in said circuits, and electrically operated means, *one* in each control circuit to actuate [said] *the associated* switches from a normal position into a second position, the normal position of said switches being such as to close a power circuit to said signal and to open it to said system, one control circuit, when closed, positioning said switches to close a power circuit to said system and open it to said signal, means responsive to the existence of a predetermined standard of safety to close that control circuit, another control circuit, when closed, positioning said switches to close a power circuit to [said signal and] said system, and manually operated means to close the last named control circuit.

6. Control means for a motor vehicle having a switch controlled source of electrical energy, an electrically operated signal, and an ignition system, said control means comprising power and control circuits, *separate* switches in said circuits, and electrically operated means, *one* in each control circuit to actuate [said] *the associated* switches from a normal position into a second position and being located at the ground end thereof, the normal position of said switches being such as to close a power circuit to said signal and to open it to said system, one control circuit, when closed, positioning said switches to close a power circuit to said system and open it to said signal, means responsive to the existence of a predetermined standard of safety to close that control circuit, another control circuit, when closed, positioning said switches to close a power circuit to [said signal and] said system, and manually operated means to close the last named control circuit.

*7. Control means for a motor vehicle having a switch controlled source of electrical energy, an electrically operated signal, and an ignition system, said control means comprising power, control and holding circuits, separate switches in said circuits, and electrically operated means, one in each control circuit to actuate the associated switches from a normal position into a second position, the normal position of said switches being such as to close a power circuit to said signal and to open it to said system, one control circuit, when closed, positioning said switches to close a power circuit to said system, manually operated means to close said control circuit, another control circuit, when closed, positioning said switches to disconnect said signal from said source, means responsive to the existence of a predetermined standard*

*of safety to close the last named control circuit, and the holding circuit including the electrically operated means of the first mentioned control circuit and having its switches arranged in series and closed one by each electrically operated means when both control circuits are closed thus to enable the signal to be maintained inoperative as long as said standard of safety is satisfied.*

*8. Control means for a motor vehicle having a switch controlled source of electrical energy, an electrically operated signal, and an ignition system, said control means comprising power, control and holding circuits, separate switches in said circuits, and electrically operated means, one in each control circuit to actuate the associated switches from a normal position into a second position, the normal position of said switches being such as to close a power circuit to said signal and to open it to said system, one control circuit, when closed, positioning said switches to close a power circuit to said system, manually operated means to close said control circuit, another control circuit, when closed, positioning said switches to disconnect said signal from said source, means*

*responsive to the existence of a predetermined standard of safety to close the last named control circuit, and the holding circuit including the electrically operated means of the first mentioned control circuit and having its switches arranged in series and closed one by each electrically operated means when both control circuits are closed thus to enable the signal to be maintained inoperative as long as said standard of safety is satisfied, said electrically operated means being located at the ground end of said control circuits.*

References Cited in the file of this patent or the original patent

UNITED STATES PATENTS

| Number | Name | Date |
|---|---|---|
| 872,039 | Adams | Nov. 26, 1907 |
| 1,720,230 | Murray | July 9, 1929 |
| 2,251,735 | Goleby | Aug. 5, 1941 |
| 2,291,610 | Crane | Aug. 4, 1942 |